United States Patent
Sun et al.

(10) Patent No.: US 12,158,899 B2
(45) Date of Patent: Dec. 3, 2024

(54) INFORMATION PROCESSING METHOD, ELECTRONIC DEVICE, AND STORAGE MEDIUM

(71) Applicant: Beijing Baidu Netcom Science Technology Co., Ltd., Beijing (CN)

(72) Inventors: Jian Sun, Beijing (CN); Weihua Peng, Beijing (CN); Chenye Wu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 20 days.

(21) Appl. No.: 17/812,742

(22) Filed: Jul. 15, 2022

(65) Prior Publication Data
US 2022/0398260 A1     Dec. 15, 2022

(30) Foreign Application Priority Data
Sep. 17, 2021   (CN) .......................... 202111096300.0

(51) Int. Cl.
 *G06F 16/28*     (2019.01)
 *G06N 20/00*     (2019.01)

(52) U.S. Cl.
 CPC .......... *G06F 16/284* (2019.01); *G06N 20/00* (2019.01)

(58) Field of Classification Search
 CPC ........ G06F 16/284; G06N 20/00; G06N 5/04; G06N 5/025; G06N 5/022
 See application file for complete search history.

(56) References Cited

U.S. PATENT DOCUMENTS

| | | | |
|---|---|---|---|
| 2019/0102688 A1* | 4/2019 | Feng | G06N 5/04 |
| 2019/0303368 A1* | 10/2019 | Liu | G06N 20/00 |
| 2019/0318256 A1 | 10/2019 | Wei et al. | |
| 2021/0224307 A1 | 7/2021 | Toshiba | |

FOREIGN PATENT DOCUMENTS

| | | |
|---|---|---|
| CN | 104182378 | 12/2014 |
| CN | 104537418 | 4/2015 |
| CN | 110555047 | 12/2019 |
| CN | 113055230 | 6/2021 |

OTHER PUBLICATIONS

Extended European Search Report, issued in the corresponding European Patent Application No. 22184657.9, dated Jan. 10, 2023, 11 pages.
First Office Action CN 202111096300.0 (Apr. 8, 2022) (22 pages).

* cited by examiner

*Primary Examiner* — Mark D Featherstone
*Assistant Examiner* — Samuel C Sharpless, III
(74) *Attorney, Agent, or Firm* — HSML P.C.

(57) ABSTRACT

An information processing method, an electronic device, and a storage medium are provided, which relate to the field of artificial intelligence technologies such as big data, knowledge graphs, deep learning and the like. The method includes: determining a first independence relationship according to a plurality of variables and values respectively corresponding to the plurality of variables, wherein the first independence relationship includes: at least two variables of the plurality of variables being relatively independent; determining a first adjustment scheme according to the plurality of variables and the first independence relationship; adjusting the first independence relationship according to the first adjustment scheme, to obtain a second independence relationship; and obtaining a causal relationship information (Continued)

processing result according to the second independence relationship.

14 Claims, 10 Drawing Sheets

INFORMATION PROCESSING METHOD, ELECTRONIC DEVICE, AND STORAGE MEDIUM

CROSS-REFERENCE TO RELATED APPLICATION

This application claims priority to Chinese patent application No. 202111096300.0, filed on Sep. 17, 2021, which is hereby incorporated by reference in its entirety.

TECHNICAL FIELD

The present disclosure relates to the field of computer technologies, and in particular to the fields of artificial intelligence technologies such as big data, knowledge graphs, deep learning, and the like.

BACKGROUND

With the development of computer technologies, computer-related technologies such as data processing and the like have also made continuous progress. In some scenes, an analysis of causal relationships in data is required.

SUMMARY

The present disclosure provides an information processing method and apparatus, an electronic device, and a storage medium.

According to an aspect of the present disclosure, there is provided an information processing method, including:
  determining a first independence relationship according to a plurality of variables and values respectively corresponding to the plurality of variables, wherein the first independence relationship includes: at least two variables of the plurality of variables being relatively independent;
  determining a first adjustment scheme according to the plurality of variables and the first independence relationship;
  adjusting the first independence relationship according to the first adjustment scheme, to obtain a second independence relationship; and
  obtaining a causal relationship information processing result according to the second independence relationship.

According to another aspect of the present disclosure, there is provided an electronic device, including:
  at least one processor; and
  a memory communicatively connected with the at least one processor, wherein
  the memory stores instructions executable by the at least one processor, and the instructions, when executed by the at least one processor, enable the at least one processor to perform the method in any one of the embodiments of the present disclosure.

According to another aspect of the present disclosure, there is provided a non-transitory computer-readable storage medium storing computer instructions, wherein the computer instructions, when executed by a computer, cause the computer to perform the method in any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the solution and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
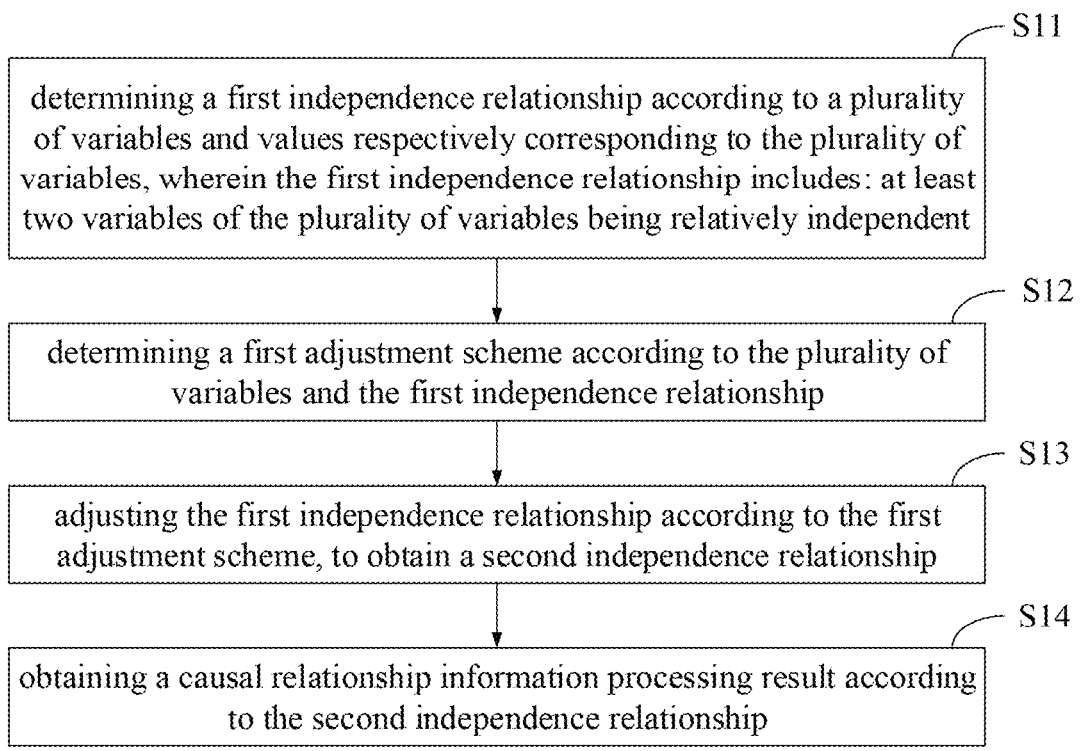
FIG. 1 is a schematic diagram of an information processing method according to an embodiment of the present disclosure.

The embodiments of the present disclosure first provide an information processing method. As shown in FIG. 1, the information processing method includes:

S11: determining a first independence relationship according to a plurality of variables and values respectively corresponding to the plurality of variables, wherein the first independence relationship includes: at least two variables of the plurality of variables being relatively independent;

S12: determining a first adjustment scheme according to the plurality of variables and the first independence relationship;

S13: adjusting the first independence relationship according to the first adjustment scheme, to obtain a second independence relationship; and S14: obtaining a causal relationship information processing result according to the second independence relationship.

According to the technology of the present disclosure, the causal relationship in the data can be analyzed, and in a case where the causal relationship needs to be adjusted, a corresponding adjustment scheme can be generated according to the first independence relationship and variables, to obtain a more accurate second independent relationship, so that the result of causal relationship analysis has high stability and accuracy. When the embodiments of the present disclosure are applied to the scenarios such as machine learning, deep learning and the like, the ability of the model to analyze data can be improved.

In this embodiment, the variables can be variables in any collected dataset for training a model or for analyzing a causal relationship. For example, for a collected dataset related to economic data, a plurality of variables can include a stock market index, a gold price, a silver price, a platinum price, a currency price of a certain country, a consumer price index, gross national economy, etc.

The variables can be parameters with a certain correlation ostensibly, or parameters with no correlation ostensibly. For example, a plurality of variables can include the stock market index, the average temperature of the earth, etc. For another example, the variables can include a population quantity, an average house price, an average income, a population birth rate, an urban greening rate, an urban area, etc.

The values respectively corresponding to the variables can be a value corresponding to each of the variables, for example, the values of the variables collected under the conditions of the same time, the same place, etc.

The values respectively corresponding to the variables can be a plurality of values corresponding to each of the variables obtained under a plurality of conditions. For example, variables A, B, C, D, E, and F correspond to a plurality of values A1, B1, C1, D1, E1, and F1 obtained under the first condition, correspond to a plurality of values A2, B2, C2, D2, E2, and F2 obtained under the second condition, and correspond to a plurality of values A3, B3, C3, D3, E3, and F3 obtained under the third condition, and so on.

Specifically, for example, the plurality of variables can include a first economic index, a first education index, a first sports index, a first city size index, a first climate index, etc. The values respectively corresponding to the plurality of variables can include the respective values of the first economic index, the first education index, the first sports index, the first city size index, and the first climate index in the year 2001, the respective values of the first economic index, the first education index, the first sports index, the first city size index, and the first climate index in the year 2002, and so on.

The values respectively corresponding to the plurality of variables can be values of the plurality of variables obtained under different conditions respectively.

For another example, a plurality of variables can include traffic flow, graduate employment rate, population birth rate, average life expectancy, etc. The values respectively corresponding to a plurality of variables can include the traffic flow in a certain month in 2001, the employment rate of graduates in 2003, the population birth rate in 2005, the average life expectancy in 2002, and so on.

In this embodiment, the first independence relationship can be: selecting at least two variables from a plurality of variables, and assuming that the selected variables are independent of at least one other variable. For example, for the plurality of variables A, B, C, D, E, and F, the first independence relationship can be that A and C are independent, or A and C are independent under the condition of other variables.

The first independence relationship can also be: performing an exhaustive or permutation combination on a plurality of variables, to obtain a plurality of individual independent assumptions. For example, for the plurality of variables A, B, C, D, E, and F, the first independence relationship can include that the plurality of variables are independent of each other.

In other implementations, the first independence relationship can also be generated by a model, for example, a plurality of variables and the values respectively corresponding to the plurality of variables are input into a processing model, and the first independence relationship is generated by the processing model.

The first independence relationship can include a plurality of individual independent assumptions (or individual independent relationships), for example, the first independent relationship includes that the variable A and the variable B are independent under the condition of the variable C, the variable C and the variable D are independent on the condition of the variable A, and the variable D and the variable E are independent of each other under any conditions. In this embodiment, the variable A and the variable B are independent under the condition of the variable C, which can mean that the variable A and the variable B are independent under the condition that there is the variable C.

In the first independence relationship, at least two variables of the plurality of variables being relatively independent can mean that the two relatively independent variables are not causal to each other, that is, there is no direct causal relationship between the both.

In the first independence relationship, at least two variables of the plurality of variables being relatively independent can also mean that there is no indirect causal relationship between the two variables.

In an embodiment of the present disclosure, the first independence relationship can include a causal relationship in which all variables and at least two variables are relatively independent.

The determining the first adjustment scheme according to a plurality of variables and the first independence relationship can be: determining, according to the attributes of the variables themselves or the values corresponding to the variables, whether the various individual independent assumptions contained in the first independence relationship are tenable. If there is an individual independent assumption that is not tenable, it means that some contents in the first independence relationship may be wrong, then it can be determined that the first independence relationship needs to be adjusted, and the first adjustment scheme to adjust the first independence relationship is determined.

In this embodiment, the adjusting the first independence relationship according to the first adjustment scheme, to obtain the second independence relationship can be: adjusting part or all of the first independence relationship according to the first adjustment scheme, so that the adjusted respective individual independent assumptions are consistent with respective variables.

In this embodiment, the adjustment process can be performed circularly for many times, until the adjustment result meets the requirements.

In this embodiment, the adjustment process can be performed by a model.

In another embodiment, S11-S14 can be performed by the model.

Causal relationship information in data plays an important role in a variety of scenarios. For example, with the development of computer technology, artificial intelligence, and other technologies, machine learning and deep learning technologies have also developed rapidly. However, with the vigorous development of machine learning and deep learning technologies, the shortcomings of machine learning models and deep learning models are gradually exposed. For example, the machine learning models and the deep learning models have the shortcomings of low transferability and low interpretability, and lack of understanding of causal relationships in training materials. The ability to learn cause and effect can be considered as the only way to overcome the aforementioned shortcomings in the scenarios of machine learning or deep learning. If the machine learning model or deep learning model can train an initial model through certain sample data, so that the initial model learns a causal relationship rule in the sample data, so as to obtain the function of inferring output data according to the input data, then the performance of the machine learning model or the deep learning model will be significantly improved.

In order to empower a machine learning model or a deep learning model to learn causal relationships, the embodiment of the present disclosure determines independence assumptions related to a plurality of variables in a dataset according to the plurality of variables in the dataset and the specific values of the variables. The causal relationship between the variables can be reflected through the independence assumptions related to the plurality of variables. The algorithm of how to recover (mine) a causal structure diagram from data can be called as a causal structure learning algorithm. How to ensure the accuracy, stability, and interpretability of causal structure output information in the scenario of low data quality (high noise environment or the noise distribution does not satisfy the Gaussian distribution) is a technical difficulty. In various fields in real life, such as finance, entertainment, user personalized recommendation and other fields that are closely related to life, it is difficult to be supplemented with a high-precision perceptron when acquiring data, and scenarios with low data quality can be found everywhere. Therefore, the embodiment of the present disclosure provides an information processing method for the above problems, which can determine a first independence relationship according to a plurality of variables in data, and adjust the first independence relationship according to the variables themselves and the first independence relationship, to continuously improve the accuracy of the independence relationship, thereby ensuring the accuracy, stability, and interpretability of the independent relationship output result even in the case of low data quality.

The information processing method provided by the embodiment of the present disclosure is universal, does not require a special field background, and can be applied to many fields of knowledge discovery, such as user personalized portrait, advertisement recommendation, image recognition, relationship mining, and the like. It can also be applied to scenarios where models need to be deployed for information and data processing, or algorithms are directly used for information and data processing. In the scenario where models need to be deployed for information and data processing, the causal relationship among a plurality of variables can be learned through training a model to obtain the connection among the variables, thereby obtaining a more accurate effect when processing data. After the model is migrated, the migrated data processing mode can be learned at a faster speed and the stability of the model is improved. And, the model processing process can no longer exist in a black box way, but can have higher interpretability.

In an implementation, the determining the first adjustment scheme according to the plurality of variables and the first independence relationship, includes:
  performing a test on a consistency between the first independence relationship and actual independence of the plurality of variables, to obtain a first test result; and
  determining the first adjustment scheme according to the first test result.

In this example, if in the first independence relationship, there are no contradictory individual independent assumptions, there are no causal relationships that constitute a cycle, and there are no missing individual independent assumptions (that is, a new V structure does not appear in the completion of the direction of the directed acyclic graph) and there is no conflict with common sense knowledge, the first independence relationship can be considered consistent with a plurality of variables.

Since the plurality of variables are actually existing variables, in this embodiment, detecting the consistency between the plurality of variables and the first independent relationship can consider the actual common sense related to the variables when processing causal relationship information, so that the processing result of the causal relationship information is more accurate.

Figure 2A:
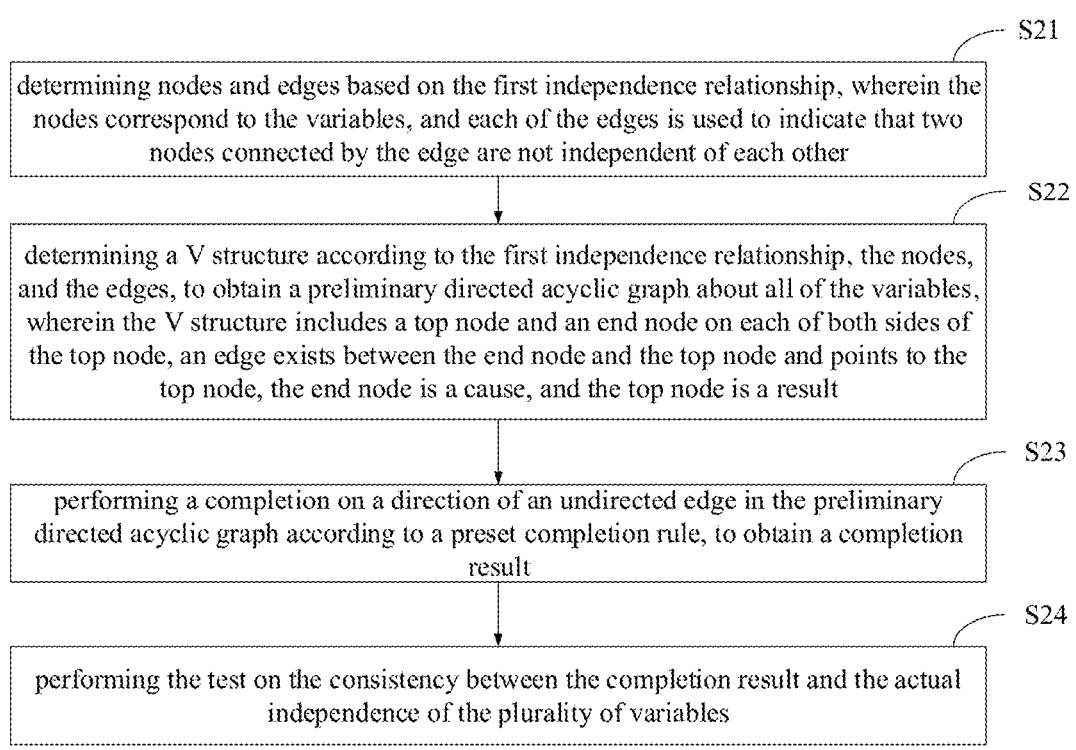
FIG. 2A is a schematic diagram of an information processing method according to another embodiment of the present disclosure.

In an implementation, as shown in FIG. 2A, the performing the test on the consistency between the first independence relationship and the actual independence of the plurality of variables, includes:
  S21: determining nodes and edges based on the first independence relationship, wherein the nodes correspond to the variables, and each of the edges is used to indicate that two nodes connected by the edge are not independent of each other;
  S22: determining a V structure according to the first independence relationship, the nodes, and the edges, to obtain a preliminary directed acyclic graph about all of the variables, wherein the V structure includes a top node and an end node on each of both sides of the top node, an edge exists between the end node and the top node and points to the top node, the end node is a cause, and the top node is a result;
  S23: performing a completion on a direction of an undirected edge in the preliminary directed acyclic graph according to a preset completion rule, to obtain a completion result; and S24: performing the test on the consistency between the completion result and the actual independence of the plurality of variables.

In this embodiment, drawing a skeleton diagram based on the first independence relationship can be executed by a model, and the skeleton diagram is drawn according to a plurality of variables and the first independence relationship. In this model, the causal relationship can be represented by a directed acyclic graph, called as a causal structure diagram.

In this embodiment, the edges in the skeleton diagram may not contain directions. In the skeleton diagram, there may be no connected edges between two variables independent of each other.

In the other implementation, the independence relationship can be a conditional independence assumption, e.g., the variables A and B are independent under the condition of the variable C. For the independent relationship, the corresponding P value can be calculated to judge whether to accept the independent relationship.

In another implementation, considering that relying only on the P value to judge the acceptability of the independence relationship, there may be a risk of inaccuracy; therefore, in order to reduce the impact of data noise, a composite score can be used to determine the possibility that the independence relationship is correct. The composite score can be determined according to a preset indicator function, the P value obtained by T times of calculation, and the number of times of calculation T, where T is a parameter set in consideration of stability and efficiency. For each individual independent assumption in the first independence relationship, if its composite score is greater than a set score threshold (the score threshold can be a rough value), the individual independent assumption is converted into the content of the skeleton, and the contents of the subsequent preliminary directed acyclic graph and the directed acyclic graph.

Figure 2B:
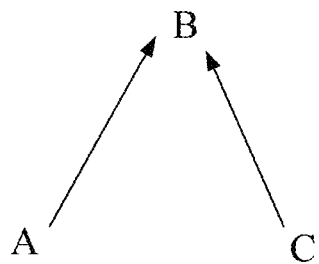
FIGS. 2B-C are schematic diagrams of V structures according to an example of the present disclosure.

In this embodiment, the V structure can be as shown in FIG. 2B. If for variables A, B, and C, there are A that is a reason of B, and C that is also a reason of B, A and B are not independent in any variable set (i.e., in any case), B and C are not independent in any variable set (i.e., in any case), A and C are independent and the independent set does not contain the variable B (i.e., A and C are independent in the case of a given variable set, but if the given variable set contains B, A and C will not be independent).

In this embodiment, the completion rule of the V structure can be that if a node is a common neighbor of two absolutely independent nodes, and the node is not in the independent set (separated set) of two other absolutely independent nodes, the node and the two other absolutely independent nodes constitutes a V structure.

Figure 2C:
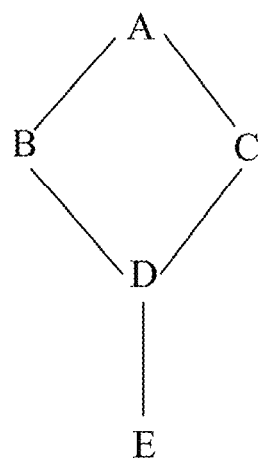
Figure 2D:
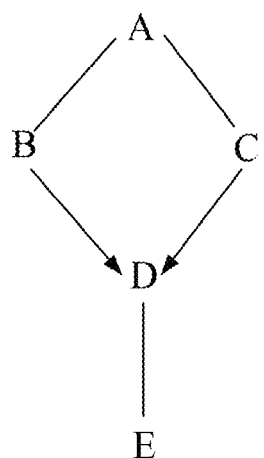
FIGS. 2D-E are schematic diagrams of a process of converting a first independence relationship into a directed acyclic graph according to an example of the present disclosure.
Figure 2E:
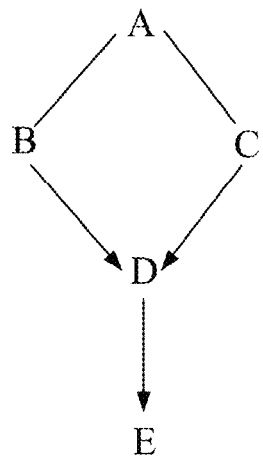
Figure 3:
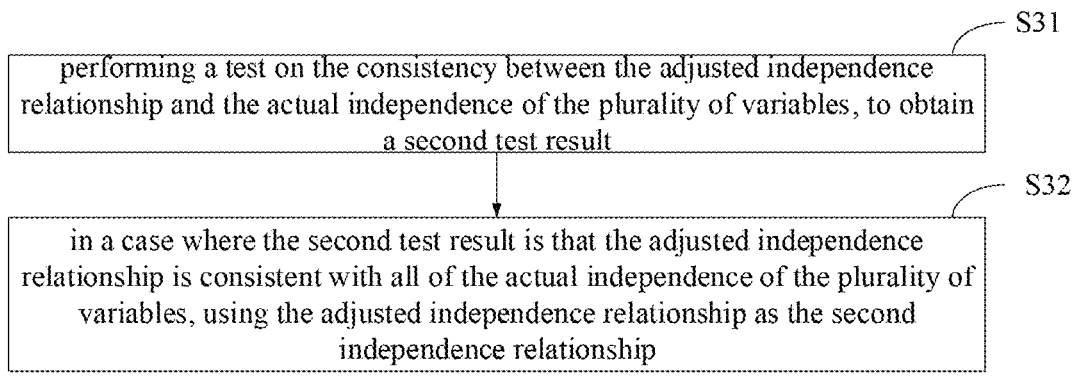
FIG. 3 is a schematic diagram of an information processing method according to yet another embodiment of the present disclosure.

Referring to FIGS. 2C-2E, the first independence relationship: A and D are independent in the case of a given {B, C}; A and E are absolutely independent; B and C are absolutely independent; B and E are independent in the case of a given {D}; and C and E are independent in the case of a given {D}. According to the assumption, the skeleton diagram shown in FIG. 2C can be obtained, and in the skeleton diagram shown in FIG. 2C all pairs of variables without edges are independent.

Since B and C are absolutely independent, D is the common neighbor of B and C, and D is not in the independent set of B and C, B, D, and C constitutes a V structure. D is a top node, and B and C are end nodes, generating the graph after adding the V structure as shown in FIG. 2D.

The completion direction is from D to E. Because if it is an opposite direction, the V structure of BDE will be generated, which will conflict with the completion rule. The resulting diagram is shown in FIG. 2E. Since the edge between A and B and the edge between A and C do not conflict with the completion rule in any direction, no direction completion is performed on the edge between A and B and the edge between A and C.

The preset completion rule can be a rule that will not cause conflict after completion. The completion rule can be partially duplicated with a consistency test rule.

The completion result can be a directed acyclic graph after completing a direction.

In the embodiment, it is determined, by establishing a skeleton, searching for the V structure, and completing a direction, whether the independence relationship is tenable, thereby improving the accuracy of the judgment result of the independence relationship.

In an implementation, the performing the completion on the direction of the undirected edge in the preliminary directed acyclic graph according to the preset completion rule, includes:

for the undirected edge in the preliminary directed acyclic graph, in a case where performing the completion according to a first direction will cause a conflict with the preset completion rule, performing the completion on the edge in accordance with a second direction opposite to the first direction; and for the undirected edge in the preliminary directed acyclic graph, in a case where performing the completion according to the first direction will not cause a conflict with the preset completion rule, and performing the completion according to the second direction will cause a conflict with the preset completion rule, performing the completion on the edge in accordance with the first direction.

In the embodiment, when complementing an undirected edge, one of the directions can be selected as the first direction, the direction of the undirected edge is determined as the first direction, and whether there is a conflict with other edges is detected. If there is a conflict with other edges, it is adjusted to another second direction. If there is no conflict with other edges, it can be marked as the first direction.

In the embodiment, according to whether there is a conflict between the completed first direction and the direction of the existing edge, the edge with no direction in the preliminary directed acyclic graph is completed, so as to obtain the directed acyclic graph of all variables, through which whether the first independence relationship has contents inconsistent with a plurality of variables can be more directly observed.

In an implementation, the performing the test on the consistency between the completion result and the actual independence of the plurality of variables, includes:

performing the test on the consistency between the completion result and the actual independence of the plurality of variables according to a preset test rule.

In the embodiment, the preset test rule can include common sense knowledge, that is, a test rule determined according to a plurality of variables and common sense. For example, based on the general cognition of human beings in a certain period of time, there is no causal relationship between climate change and production efficiency. For another example, based on the general cognition of human beings in a certain period of time, there is a causal relationship between climate change and the distribution of animals and plants. The preset test rule can also include a common sense test rule related to the directed acyclic graph.

Specifically, for example, the preset test rule can include that: there are no edges with opposite directions (edges pointing to both ends at the same time) in a directed acyclic graph, no directed cycles are included, and no new V structures appear in a completion operation, and it does not conflict with common sense knowledge.

If the directed acyclic graph corresponding to a completion result violates the preset test rule, it is considered that the completion result fails to pass the consistency test.

In this embodiment, the common sense based test rule is used to perform the consistency test on the completion result, so that when analyzing causal relationships, common sense can be combined to make the analysis result of the causal relationship more accurate.

In an implementation, the at least two variables of the plurality of variables include a first variable and a second variable; and the at least two variables of the plurality of variables being relatively independent, includes:
  the first variable and the second variable being independent under a condition that there is a further variable;
  or, the first variable and the second variable being relatively independent.

In this embodiment, the further variables can be one or more further variables. That is, the further variable serves as the condition that the first variable and the second variable are independent.

In this embodiment, for the first independence relationship, two relatively independent variables can constitute a variable pair, and the variable pair and the corresponding independent condition can constitute an individual independent assumption. A plurality of individual independent assumptions can be included in the first independence relationship and the second independence relationship.

If the first variable and the second variable are absolutely independent, the independent condition of the first variable and the second variable may not be included in the first independence relationship.

In the embodiment, through individual independent assumptions of two different forms, the individual independent assumption or the first independence relationship can be divided into an independence level and a separation set level. The independence level can include that the first variable and the second variable are independent, and the separation set level can include the condition that the first variable and the second variable are independent. Therefore, when the first adjustment scheme is determined, more accurate adjustment schemes can be set for the independence level and the separation set level respectively, so that the adjustment result is more accurate.

In an implementation, in a case where the first variable and the second variable are independent under the condition that there is the further variable, the first adjustment scheme includes: adjusting the further variable.

In the embodiment, first it can be assumed that the basic skeleton (skeleton diagram) corresponding to the first independence relationship is correct, but the independent condition is wrong. Then, the separation set as the independent condition is adjusted first.

In a specific implementation, when adjusting the further variable, i.e., adjusting the separation set, all possible separation sets can be tested in sequence, and the separation set with the highest corresponding score or correct ratio is selected.

In another specific implementation, in order to save processing time, when adjusting the further variable, i.e., adjusting the separation set, only the V structure can be adjusted. However, not constituting a V structure, i.e., an individual independent assumption without independent conditions will not affect the direction of the directed acyclic graph, so it can be not considered when adjusting the separation set.

In a specific implementation, when adjusting the separation set, the causal relationship that obviously violates common sense knowledge can be adjusted. For example, according to the directed acyclic graph obtained from the first independence relationship, the stock market index affects the disease incidence rate, then the content of the graph corresponding to the result is obviously wrong and can be adjusted.

In a possible implementation, if there are a plurality of schemes for the adjustment of the separation set, the adjustment scheme with the highest composite score can be obtained by scoring each individual independent assumption, so that the scoring mechanism can be used to reduce the effect of data noise on processing.

In the embodiment, the first adjustment scheme can include adjusting the separation set first, thus the first independence relationship can be adjusted without changing the skeleton of the directed acyclic graph of the entire first independence relationship, so that the adjustment process is from small to large, while reducing the total adjustment operations, the accuracy of the adjustment and the completeness of the scheme traversal are guaranteed.

In an implementation, the first adjustment scheme further includes: adjusting relative independence of the first variable and the second variable.

In a case where the correct second independence relationship cannot be obtained by adjusting the separation set, there is an error in the skeleton part considering the first independence relationship.

In the adjustment process, the edges in the directed acyclic graph can be added or deleted, that is, the relative independence of each variable in the independence relationship can be adjusted.

In the embodiment, the independence level of the first independence relationship is adjusted, so that in the case wherein there is a skeleton error in the first independence relationship, it can be corrected to improve the accuracy of subsequent causal relationship information processing result.

In an implementation, after adjusting the first independence relationship according to the first adjustment scheme, to obtain the second independence relationship, the method further includes:
  S31: performing a test on the consistency between the adjusted independence relationship and the actual independence of the plurality of variables, to obtain a second test result; and
  S32: in a case where the second test result is that the adjusted independence relationship is consistent with all of the actual independence of the plurality of variables, using the adjusted independence relationship as the second independence relationship.

In a case where the second test result is that the adjusted independence relationship is consistent with all of the actual independence of the plurality of variables, it can be indicated that the adjusted independence relationship is the correct independence relationship.

In the embodiment, in a case where the adjusted first independence relationship passes the consistency test, the adjusted first independence relationship is used as the second independence relationship, so that the correct causal relationship information processing results can be obtained according to the second independence relationship.

In an implementation, the information processing method further includes:

in a case where the second test result is that the adjusted independence relationship is inconsistent with the actual independence of the plurality of variables, using the adjusted independence relationship as a new first independence relationship; and adding one to the number of adjustments, and returning to the operation of determining the first adjustment scheme according to the plurality of variables and the first independence relationship.

In this embodiment, the initial number of adjustments can be set to 0, and after each adjustment, the number of adjustments is incremented by 1, and the number of adjustments is counted.

At the same time, in a case where the second test result is that the adjusted independence relationship is inconsistent with the plurality of variables, it is indicated that the adjusted independence relationship may still not be the correct independence relationship, or that there is at least one independence relationship in the adjusted independence relationship. In this case, the adjustment of the first independence relationship can be performed circularly for many times, thereby finally improving the correctness of the second independence relationship.

In this embodiment, the self-correction mechanism is realized through a plurality of adjustments to the first independence relationship, which can ensure that the first independence relationship is closer to the correct independence relationship and ensure the accuracy of the causal relationship information processing result obtained subsequently.

Figure 4:
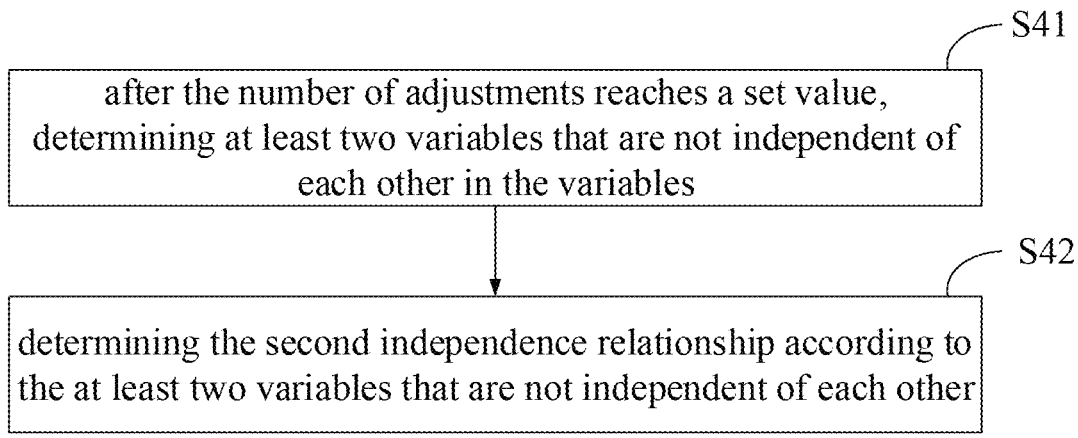
FIG. 4 is a schematic diagram of an information processing method according to yet another embodiment of the present disclosure.

In an implementation, as shown in FIG. 4, the information processing method further includes:

S41: after the number of adjustments reaches a set value, determining at least two variables that are not independent of each other in the variables; and S42: determining the second independence relationship according to the at least two variables that are not independent of each other.

In the embodiment, for determining at least two variables that are not independent of each other in the variable, either positive implementation or negative implementation can be performed. For example, it can be to determine two or more variables that are not independent of each other; it can also be to determine two or more variables that are obviously independent of each other.

In this embodiment, after a certain number of cycles, the adjustment can be terminated in advance for some variables, that is, at least two variables are set to be independent of each other, thereby saving operation steps and improving operation efficiency.

In an implementation, the obtaining the causal relationship information processing result according to the second independence relationship, includes:

determining a causal relationship among the plurality of variables according to the second independence relationship.

Figure 7:
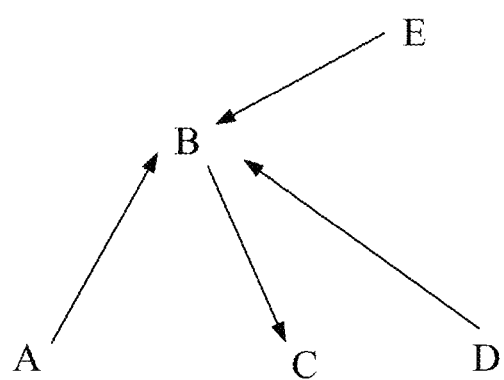
FIG. 7 is a schematic diagram of a causal relationship according to an example of the present disclosure.

In this embodiment, the causal relationship between a plurality of variables can be a causal relationship in which at least part of the plurality of variables are mutually causal. For example, as shown in FIG. 7, for variables A, B, C, D, and E, the determined causal relationship can include: in a case where A is the cause, B is the effect; in a case where B is the cause, C is the effect; in a case where D is the cause, C is the effect; and in a case where E is the cause, B is the effect.

In this embodiment, the causal relationship between a plurality of variables can be determined according to the second independence relationship, and the causal relationship between the plurality of variables can be used as the causal relationship information processing result, so that the causal relationship between the variables can be obtained according to the dataset, and the causal relationship is used to optimize the machine learning model or deep learning model.

The first independence relationship in the embodiment of the present disclosure can include a plurality of individual independent assumptions, and the individual independent assumptions can be given in the following form: the variable X and the variable Y are independent in the case of a given variable set Z, wherein the variable set Z can be an empty set. If the independence assumption is true, the variable set Z will be called as a separation set of variables X and Y. Therefore, the correctness of each individual independent assumption and even the entire first independence relationship can be divided into two levels, one is the independence level, and the other is the separation set level.

The specific content of the independence level includes: Are the variable X and the variable Y really independent? The specific content of the separation set level includes: Are the variable X the variable Y independent after a variable set Z is given? An individual independent assumption can be considered correct only if both levels are correct.

In determining the directed acyclic graph according to the first independence relationship, the two levels of each individual independent assumption act individually. Whether the independence level is correct will determine whether the skeleton of the directed acyclic graph is correct. After the skeleton of the directed acyclic graph is given, whether the separation set level is correct will determine whether each V structure in the directed acyclic graph is correct. After the correct V structure is given, the process of completing other directions in the directed acyclic graph does not involve independent assumptions.

Based on the above findings, according to the embodiment of the present disclosure, after the first independence relationship is determined, the consistency test is set up to test whether a consistent (i.e., possibly correct, because an inconsistent structure must not be a real structure) causal structure diagram can be obtained according to the first independence relationship, and the self-correction mechanism is set up to adjust the information processing process in time when the consistency test fails, that is, when all optional causal structures generated according to the first independence relationship must be incorrect, to change the first independence relationship and finally obtain the correct second independence relationship.

Figure 5:
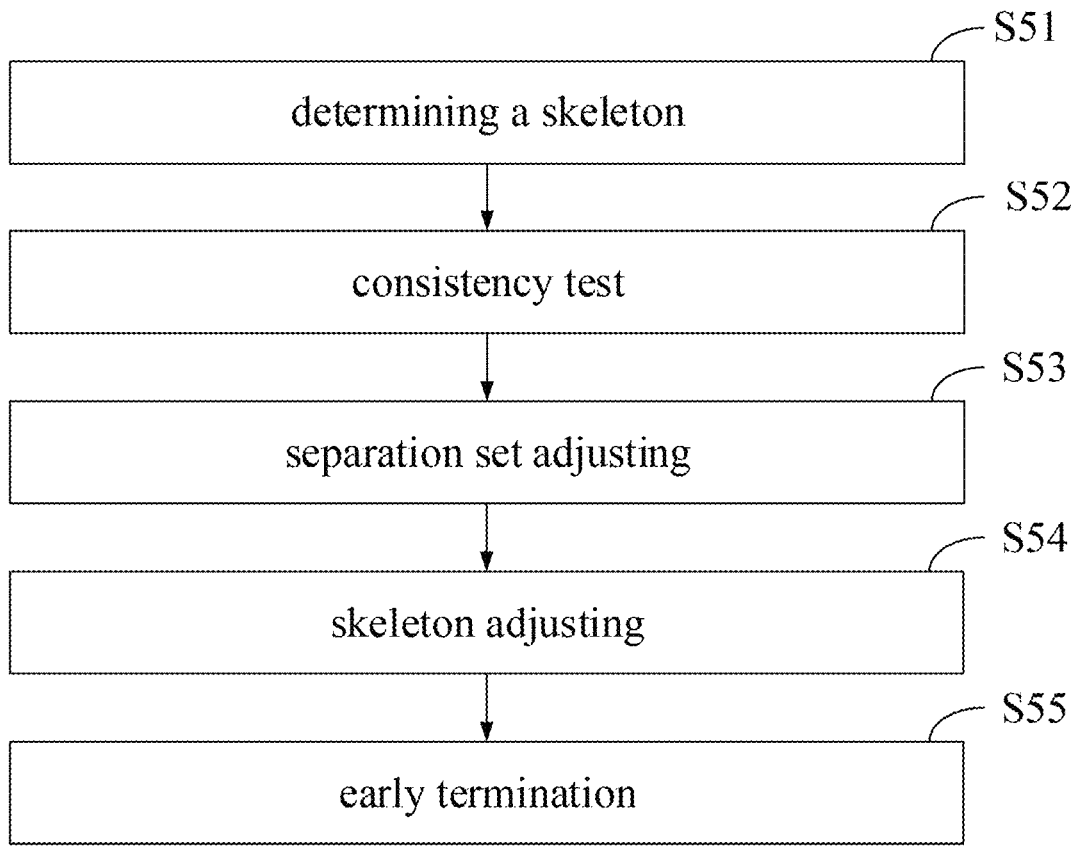
FIG. 5 is a schematic diagram of an information processing method according to an example of the present disclosure.

In an example of the present disclosure, as shown in FIG. 5, the information processing method includes:

S51: determining a skeleton (Skeleton Finding).

In the process of determining the skeleton, an independent assumption set that is considered to be true can be initialized and set according to a plurality of variables and the values of the plurality of variables, and the operations of determining the skeleton can be finished according to the independent assumption set. The skeleton of the directed acyclic graph can be drawn according to the independent assumption set. The directed acyclic graph includes nodes and edges, the nodes correspond to variables, and the edges correspond to the relationships between the nodes. The direction of the edge corresponds to the causal relationship between the nodes, which is from a cause node to a result node.

S52: consistency test.

In S52, based on the skeleton, the V structure is determined, and other directions other than the determined V structure are completed.

In the process, whether the currently obtained causal structure diagram has the following situations in the determination of V results or the completion process is detected: (1) there is a certain edge, which is marked as the opposite direction by other different independent assumptions in the independent assumption set, that is, it contradicts the other different independent assumptions; (2) a directed cycle appears; (3) a new V structure is generated in the process of complementing other directions, that is, no V structure is generated in the process of determining the V structure; and (4) the causal structure diagram violates common sense knowledge. If any of the above four situations occurs, the current causal structure diagram fails to pass the consistency test.

Only if the causal structure diagram that passes the consistency test is consistent with the theoretical assumption (i.e., the directed acyclic graph), it has interpretability and it can be a correct causal structure diagram.

If the consistency test fails, the independence relationship needs to be adjusted, that is, S53 and subsequent operations in FIG. 5 are executed.

S53: separation set adjusting.

Assuming that the first level of all independence assumptions, i.e., the independence level, is correct, but there is a second level of independence assumptions, i.e., the separation set level is wrong. Based on this assumption, all independent assumptions that may have a separation set error in the separation sets are selected, other possible separation sets are traversed to form new independent assumptions, the new independent assumptions are scored, and the independent assumption with the highest score after testing is retained.

S54: skeleton adjusting.

Complementary to the assumption of the separation set adjustment operation, this operation assumes that there is an error at the independence level of the independence assumption. The independent assumption that is most likely to have an independence error is found according to the score of the assumption test sub-algorithm, then its independence is cancelled, and the operation of determining the skeleton is re-executed.

Since the assumptions of this module and the previous module are complementary, that is, all factors that can lead to the inconsistency of the causal structure diagram have been considered and repaired, the algorithm itself is complete.

S55: early termination.

When the number of cycles reaches a certain threshold and increases the burden on the algorithm, an early termination measure is taken such that the algorithm output quickly. Specifically, when the consistency test still fails after a plurality of adjustment and test process cycles, an independent assumption that contradicts most of the independent assumptions is found according to the voting results of all independent assumptions, and the assumption cannot mark any direction in the subsequent operation of determining the V Structure and other subsequent operations.

In general, the method to measure the performance of a causal structure learning algorithm is to generate a dataset by a given causal structure diagram G, only use the dataset as the input of the causal structure learning algorithm, and obtain a causal structure diagram G' output by the algorithm. The similarity between this diagram and the real causal structure diagram G is used as a measurement indicator. The greater the similarity between G and G' is, the better the effect of the causal structure learning algorithm is. The classic indicator to measure the similarity between two causal structure diagrams is the structural Hamming distance. The smaller the indicator is, the higher the similarity is. In addition to being affected by the similarity between two images, the structural Hamming distance also shows a tendency to change with the dataset size, and the larger the dataset size is, the larger the indicator of the structural Hamming distance is. Therefore, although the indicator can measure the performance effect of different algorithms on a certain dataset, it is relatively poor in measuring the performance effect of the same algorithm on different datasets.

Therefore, in order to establish a unified indicator of the dataset so as to observe the impact of datasets of different sizes on the performance of the algorithm, in the example of the present disclosure, the indicator is divided by the dataset size (the number of nodes), and the obtained average structural Hamming distance is used as the final measurement indicator. This ratio value is only for convenience to show the impact of datasets of different sizes on the algorithm, and does not discriminate against any algorithm. In addition, since the algorithm result output by the example of the present disclosure may contain more than one causal structure diagram, i.e., a list of causal structure diagrams [G'] is obtained, the minimum result of the average structural Hamming distance (MASHD) in the list can be used as the final performance.

In the example of the present disclosure, in order to compare the effects of the information processing method and other algorithms, four data structures are acquired from the known dataset acquisition platform BNlearn (Bayesian Network learn). The names of the four data structures are Cancer, Survey, Asia, and Child, respectively. The specific parameters are shown in Table 1. The four data structures include a plurality of variables, the values of the variables can be acquired according to the four known data structures, to generate a dataset, and the causal relationship between the variables in the data structures can be determined by using the dataset. The comparative effects of the information processing method proposed in the example of the present disclosure and other ten information processing methods in four datasets of different sizes are shown in FIGS. 6A-D.

TABLE 1

|  | Names of datasets | | | |
| --- | --- | --- | --- | --- |
|  | Cancer | Survey | Asia | Child |
| The number of nodes | 5 | 6 | 8 | 20 |
| The number of edges | 4 | 6 | 8 | 25 |

Figure 6A:
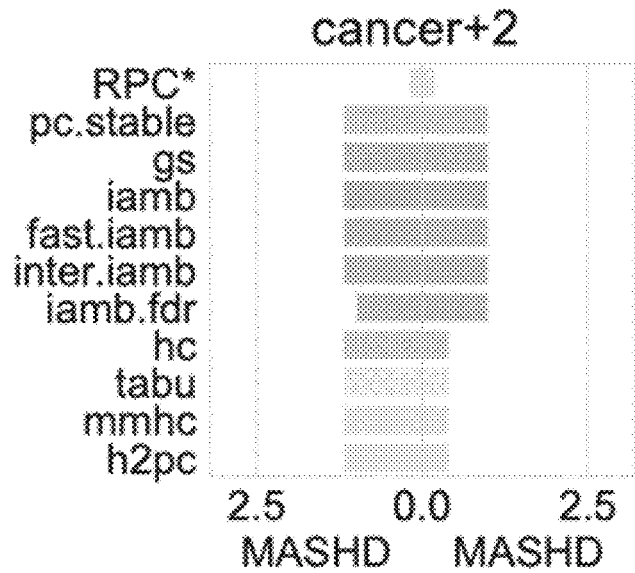
FIGS. 6A-D are schematic diagrams illustrating comparison of processing effects according to an example of the present disclosure.
Figure 6B:
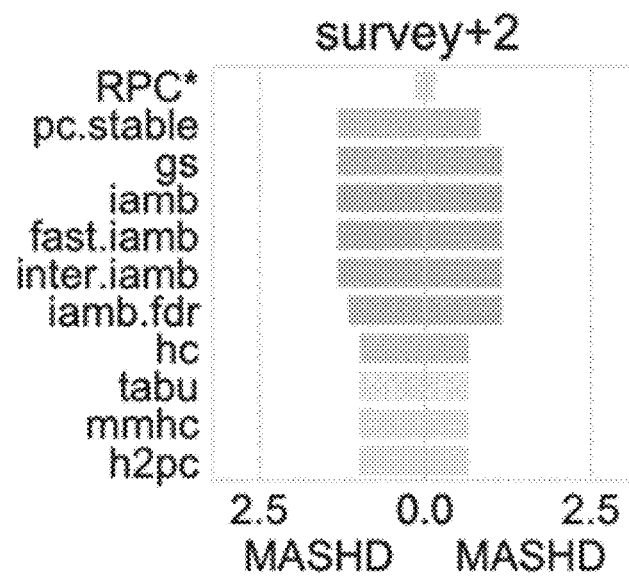
Figure 6C:
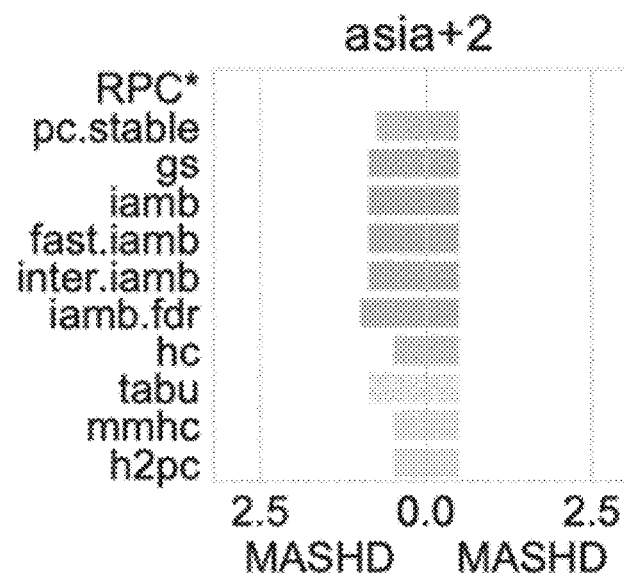
Figure 6D:
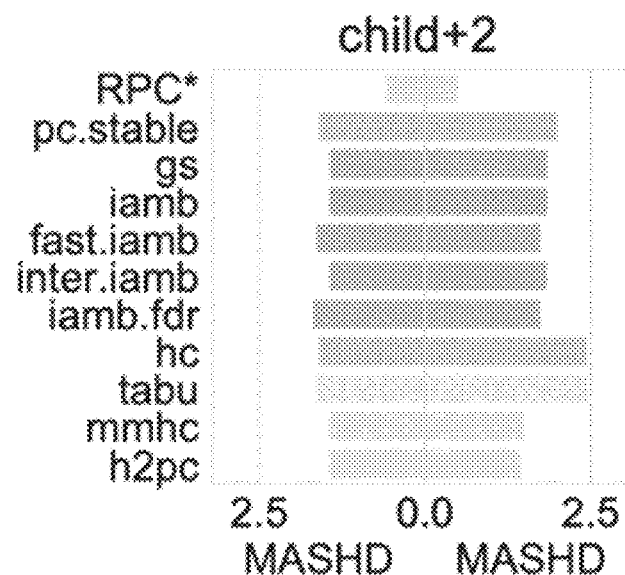

FIG. 6A is the structural Hamming distance between the causal relationship graph (directed acyclic graph) and the reference graph obtained by the dataset Cancer using the information processing method provided by the example of the present disclosure and the following algorithms: pc.stable (Peter and Clark stable, PC stable) algorithm, gs (Grow Shrink) algorithm, iamb (Incremental Association Markov Blanket) algorithm, fast.iamb (fast iamb) algorithm, inter.iamb (Interleaved iamb) algorithm, iamb.fdr (iamb with false discovery rate) algorithm, hc (Hill Climbing)

algorithm, tabu (Tabu Search) algorithm, mmhc (Max-Min Hill-Climbing) algorithm, h2pc (Hybrid Parents and Children) algorithm. It can be seen that, in a case where the variance noise is 2, for four different known datasets, the information processing method provided by the example of the present disclosure can obtain a causal relationship graph that is more resolved than the reference graph.

Figure 8:
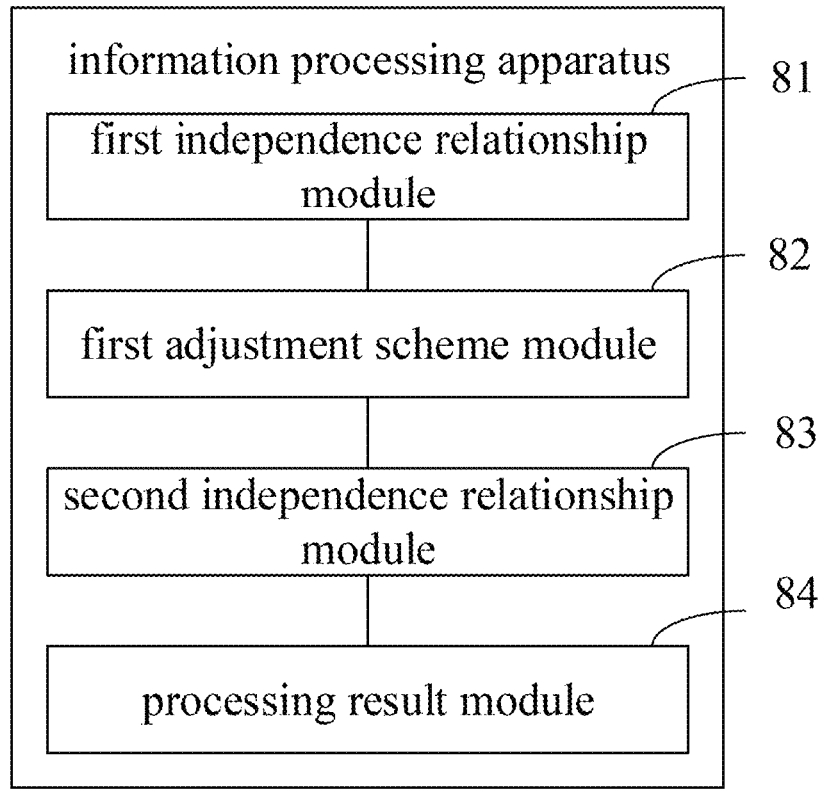
FIG. 8 is a schematic diagram of an information processing apparatus according to an embodiment of the present disclosure.

An embodiment of the present disclosure further provides an information processing apparatus, as shown in FIG. 8, including:

a first independence relationship module 81, configured for determining a first independence relationship according to a plurality of variables and values respectively corresponding to the plurality of variables, wherein the first independence relationship includes: at least two variables of the plurality of variables being relatively independent;

a first adjustment scheme module 82, configured for determining a first adjustment scheme according to the plurality of variables and the first independence relationship;

a second independence relationship module 83, configured for adjusting the first independence relationship according to the first adjustment scheme, to obtain a second independence relationship; and a processing result module 84, configured for obtaining a causal relationship information processing result according to the second independence relationship.

Figure 9:
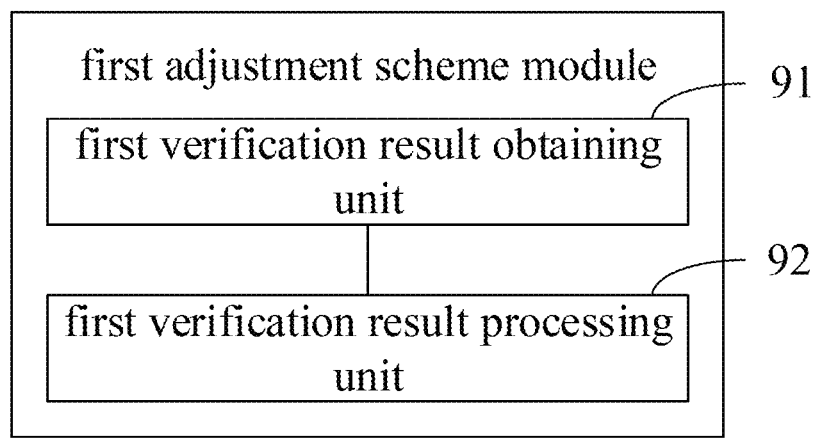
FIG. 9 is a schematic diagram of an information processing apparatus according to another embodiment of the present disclosure.

In an implementation, as shown in FIG. 9, the first adjustment scheme module includes:

a first verification result obtaining unit 91, configured for performing a test on a consistency between the first independence relationship and actual independence of the plurality of variables, to obtain a first test result; and a first verification result processing unit 92, configured for determining the first adjustment scheme according to the first test result.

In an implementation, the first verification result obtaining unit is further configured for:

determining nodes and edges based on the first independence relationship, wherein the nodes correspond to the variables, and each of the edges is used to indicate that two nodes connected by the edge are not independent of each other;

determining a V structure according to the first independence relationship, the nodes, and the edges, to obtain a preliminary directed acyclic graph about all of the variables, wherein the V structure includes a top node and an end node on each of both sides of the top node, an edge exists between the end node and the top node and points to the top node, the end node is a cause, and the top node is a result;

performing a completion on a direction of an undirected edge in the preliminary directed acyclic graph according to a preset completion rule, to obtain a completion result; and performing the test on the consistency between the completion result and the actual independence of the plurality of variables.

In an implementation, the first verification result obtaining unit is further configured for:

for the undirected edge in the preliminary directed acyclic graph, in a case where performing the completion according to a first direction will cause a conflict with the preset completion rule, and performing the completion according to the second direction will cause a conflict with the preset completion rule, performing the completion on the edge in accordance with a second direction opposite to the first direction; and for the undirected edge in the preliminary directed acyclic graph, in a case where performing the completion according to the first direction will not cause a conflict with the preset completion rule, performing the completion on the edge in accordance with the first direction.

In an implementation, the first verification result obtaining unit is further configured for:

performing the test on the consistency between the completion result and the actual independence of the plurality of variables according to a preset test rule.

In an implementation, the at least two variables of the plurality of variables include a first variable and a second variable; and the at least two variables of the plurality of variables being relatively independent, includes:

the first variable and the second variable being independent under a condition that there is a further variable;

or, the first variable and the second variable being relatively independent.

In an implementation, in a case where the first variable and the second variable are independent under the condition that there is the further variable, the first adjustment scheme includes: adjusting the further variables.

In an implementation, the first adjustment scheme further includes: adjusting relative independence of the first variable and the second variable.

Figure 10:
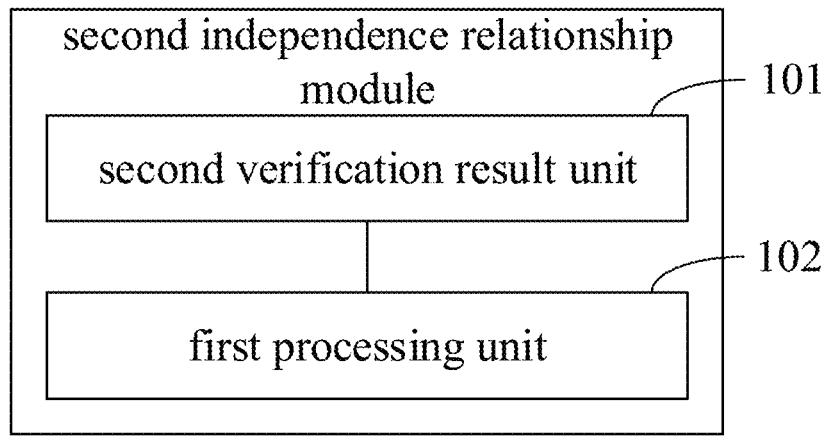
FIG. 10 is a schematic diagram of an information processing apparatus according to yet another embodiment of the present disclosure.

In an implementation, as shown in FIG. 10, the second independence relationship module includes:

a second verification result unit 101, configured for performing a test on the consistency between the adjusted first independence relationship and the actual independence of the plurality of variables, to obtain a second test result; and a first processing unit 102, configured for in a case where the second test result is that the adjusted independence relationship is consistent with all of the actual independence of the plurality of variables, using the adjusted independence relationship as the second independence relationship.

Figure 11:
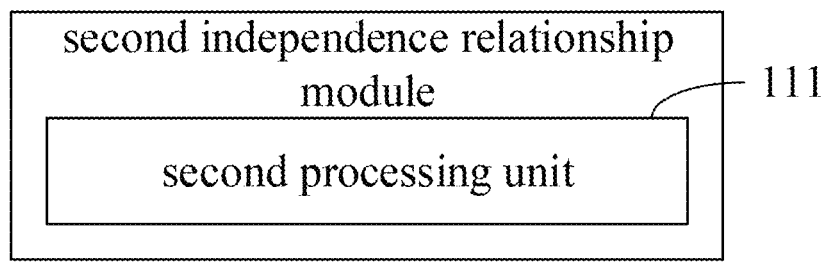
FIG. 11 is a schematic diagram of an information processing apparatus according to yet another embodiment of the present disclosure.

In an implementation, as shown in FIG. 11, the second independence relationship module further includes:

a second processing unit 111, configured for, in a case where the second test result is that the adjusted independence relationship is inconsistent with the actual independence of the plurality of variables, using the adjusted independence relationship as a new first independence relationship, adding one to the number of adjustments, and returning to the operation of determining the first adjustment scheme according to the plurality of variables and the first independence relationship.

Figure 12:
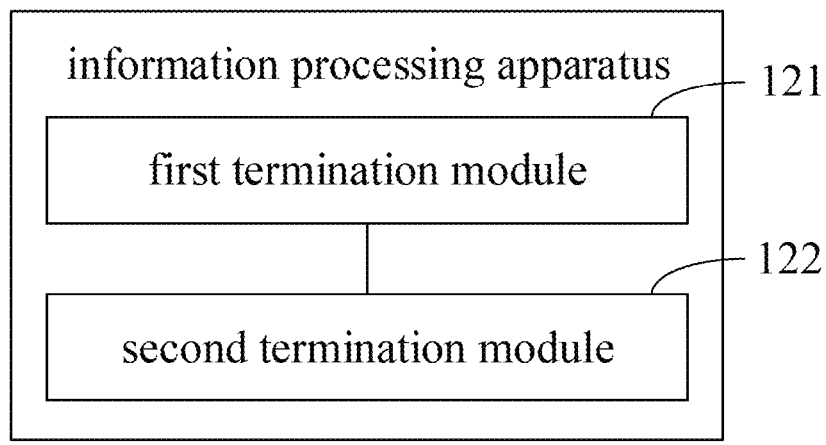
FIG. 12 is a schematic diagram of an information processing apparatus according to yet another embodiment of the present disclosure.

In an implementation, as shown in FIG. 12, the information processing apparatus further includes:

a first termination module 121, configured for, after the number of adjustments reaches a set value, determining at least two variables that are not independent of each other in the variables; and a second termination module 122, configured for determining the second independence relationship according to the at least two variables that are not independent of each other.

In an implementation, the processing result module is further configured for:

determining a causal relationship among the plurality of variables according to the second independence relationship.

The functions of each unit, module or sub module in each apparatus of the embodiment of the present disclosure can be referred to the corresponding description in the above method embodiment, and will not be repeated here.

According to the embodiments of the present disclosure, the present disclosure also provides an electronic device, a readable storage medium, and a computer program product.

Figure 13:
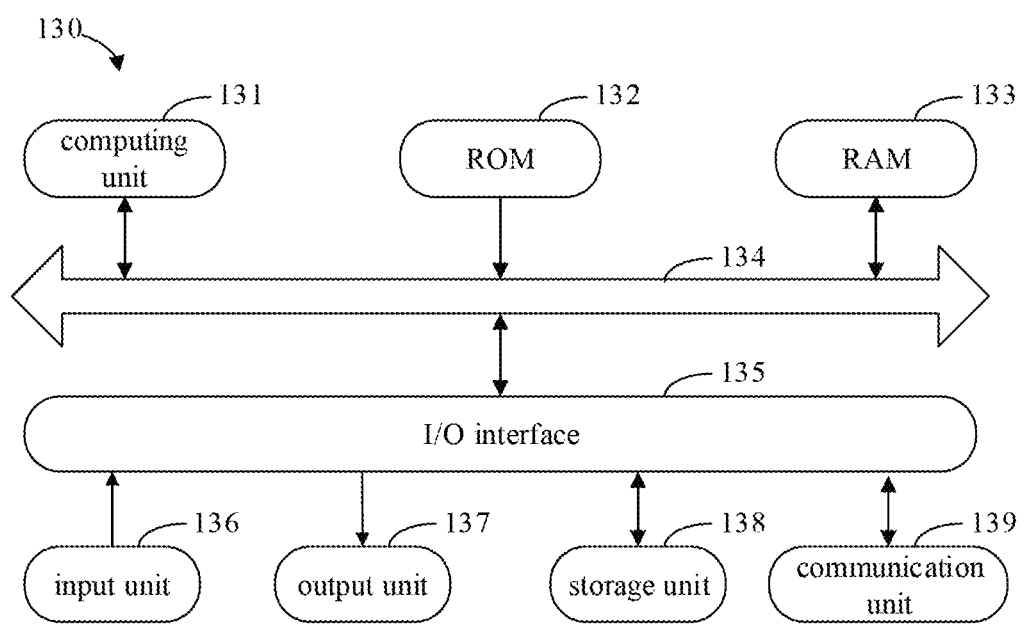
FIG. 13 is a block diagram of an electronic device for implementing the information processing method of the embodiment of the present disclosure.

FIG. 13 shows a schematic block diagram of an example electronic device 130 that can be configured to implement the embodiments of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 13, the electronic device 130 includes a computing unit 131 that can perform various suitable actions and processes in accordance with computer programs stored in a read only memory (ROM) 132 or computer programs loaded from a storage unit 138 into a random access memory (RAM) 133. In the RAM 133, various programs and data required for the operation of the electronic device 130 can also be stored. The computing unit 131, the ROM 132, and the RAM 133 are connected to each other through a bus 134. An input/output (I/O) interface 135 is also connected to the bus 134.

A plurality of components in the electronic device 130 are connected to the I/O interface 135, including: an input unit 136, such as a keyboard, a mouse, etc.; an output unit 137, such as various types of displays, speakers, etc.; a storage unit 138, such as a magnetic disk, an optical disk, etc.; and a communication unit 139, such as a network card, a modem, a wireless communication transceiver, etc. The communication unit 139 allows the electronic device 130 to exchange information/data with other devices over a computer network, such as the Internet, and/or various telecommunications networks.

The computing unit 131 can be various general purpose and/or special purpose processing assemblies having processing and computing capabilities. Some examples of the computing unit 131 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 131 performs various methods and processes described above, such as the information processing method. For example, in some embodiments, the information processing method can be implemented as computer software programs that are physically contained in a machine-readable medium, such as the storage unit 138. In some embodiments, some or all of the computer programs can be loaded into and/or installed on the electronic device 130 via the ROM 132 and/or the communication unit 139. In a case where the computer programs are loaded into the RAM 133 and executed by the computing unit 131, one or more of operations of the information processing method can be performed. Alternatively, in other embodiments, the computing unit 131 can be configured to perform the information processing method in any other suitable manner (e.g., by means of a firmware).

Various implementations of the systems and techniques described herein above can be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, firmware, software, and/or a combination thereof. These various implementations can include an implementation in one or more computer programs, which can be executed and/or interpreted on a programmable system including at least one programmable processor; the programmable processor can be a dedicated or general-purpose programmable processor and capable of receiving and transmitting data and instructions from and to a storage system, at least one input device, and at least one output device.

The program codes for implementing the method of the present disclosure can be written in any combination of one or more programming languages. These program codes can be provided to a processor or controller of a general purpose computer, a special purpose computer, or other programmable data processing apparatus such that the program codes, when executed by the processor or controller, enable the functions/operations specified in the flowchart and/or the block diagram to be implemented. The program codes can be executed entirely on a machine, partly on a machine, partly on a machine as a stand-alone software package and partly on a remote machine, or entirely on a remote machine or server.

In the context of the present disclosure, the machine-readable medium can be a tangible medium that can contain or store programs for using by or in connection with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. More specific examples of the machine-readable storage medium can include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here can be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user can be any form of sensory feedback (e.g., visual feedback, auditory feedback, or tactile feedback); and an input from the user can be received in any form (including an acoustic input, a voice input, or a tactile input).

The systems and techniques described herein can be implemented in a computing system (e.g., as a data server)

that includes a background component, or a computing system (e.g., an application server) that includes a middleware component, or a computing system (e.g., a user computer having a graphical user interface or a web browser through which a user can interact with implementations of the systems and techniques described herein) that includes a front-end component, or a computing system that includes any combination of such a background component, middleware component, or front-end component. The components of the system can be connected to each other through a digital data communication in any form or medium (e.g., a communication network). Examples of the communication network include a local area network (LAN), a wide area network (WAN), and the Internet.

The computer system can include a client and a server. The client and the server are typically remote from each other and typically interact via the communication network. The relationship of the client and the server is generated by computer programs running on respective computers and having a client-server relationship with each other.

It should be understood that the operations can be reordered, added, or deleted using the various flows illustrated above. For example, various operations described in the present disclosure can be performed concurrently, sequentially, or in a different order, so long as the desired results of the technical solutions provided in the present disclosure can be achieved, and there is no limitation herein.

The above-described specific embodiments do not limit the protection scope of the present disclosure. It will be apparent to those skilled in the art that various modifications, combinations, sub-combinations, and substitutions are possible, depending on design requirements and other factors. Any modifications, equivalent substitutions, and improvements within the spirit and principles of the present disclosure are intended to be included within the protection scope of the present disclosure.

What is claimed is:

1. An information processing method, comprising:
    determining a first independence relationship according to a plurality of variables and values respectively corresponding to the plurality of variables, wherein the first independence relationship comprises: the plurality of variables being independent of each other;
    determining a first adjustment scheme according to the plurality of variables and the first independence relationship;
    adjusting the first independence relationship according to the first adjustment scheme, to obtain a second independence relationship; and
    obtaining a causal relationship information processing result according to the second independence relationship,
    wherein the determining the first adjustment scheme according to the plurality of variables and the first independence relationship, comprises:
        performing a test on a consistency between the first independence relationship and actual independence of the plurality of variables, to obtain a first test result; and
        determining the first adjustment scheme according to the first test result,
    wherein at least two variables of the plurality of variables comprise a first variable and a second variable; and the plurality of variables being independent of each other comprises:
        the first variable and the second variable being independent under a condition that there is a further variable; or
        the first variable and the second variable being relatively independent,
    wherein for the first independence relationship, two relatively independent variables constitute a variable pair, and the variable pair and a corresponding independent condition constitute an individual independent assumption; through individual independent assumptions of two different forms, the individual independent assumption or the first independence relationship is divided into an independence level and a separation set level, the independence level comprises that the first variable and the second variable are independent, and the separation set level comprises a condition that the first variable and the second variable are independent,
    in a case where the first variable and the second variable are independent under the condition that there is the further variable, the first adjustment scheme comprises: adjusting the further variable, by using at least one of schemes of:
        testing all possible separation sets in sequence, and selecting a separation set with a highest corresponding score or correct ratio;
        adjusting a V structure; or
        adjusting a causal relationship that violates common sense knowledge,
    wherein in a case that there are a plurality of schemes for adjusting a separation set, a scheme with a highest composite score is obtained by scoring each individual independent assumption.

2. The method of claim 1, wherein the performing the test on the consistency between the first independence relationship and the actual independence of the plurality of variables, comprises:
    determining nodes and edges based on the first independence relationship, wherein the nodes correspond to the variables, and each of the edges is used to indicate that two nodes connected by the edge are not independent of each other;
    determining the V structure according to the first independence relationship, the nodes, and the edges, to obtain a preliminary directed acyclic graph about all of the variables, wherein the V structure comprises a top node and an end node on each of both sides of the top node, an edge exists between the end node and the top node and points to the top node, the end node is a cause, and the top node is a result;
    performing a completion on a direction of an undirected edge in the preliminary directed acyclic graph according to a preset completion rule, to obtain a completion result; and
    performing the test on the consistency between the completion result and the actual independence of the plurality of variables.

3. The method of claim 2, wherein the performing the completion on the direction of the undirected edge in the preliminary directed acyclic graph according to the preset completion rule, comprises:
    for the undirected edge in the preliminary directed acyclic graph, in a case where performing the completion according to a first direction will cause a conflict with the preset completion rule, performing the completion on the edge in accordance with a second direction opposite to the first direction; and for the undirected edge in the preliminary directed acyclic graph, in a case where performing the completion according to the first direction will not cause a conflict with the preset completion rule, and performing the completion according to the second direction will cause a conflict with the preset completion rule, performing the completion on the edge in accordance with the first direction.

4. The method of claim 2, wherein the performing the test on the consistency between the completion result and the actual independence of the plurality of variables, comprises:
performing the test on the consistency between the completion result and the actual independence of the plurality of variables according to a preset test rule.

5. The method of claim 1, wherein the first adjustment scheme comprises:
adjusting relative independence of the first variable and the second variable.

6. The method of claim 1, wherein the adjusting the first independence relationship according to the first adjustment scheme, to obtain the second independence relationship, comprises:
performing a test on the consistency between the adjusted first independence relationship and the actual independence of the plurality of variables, to obtain a second test result; and
in a case where the second test result is that the adjusted independence relationship is consistent with all of the actual independence of the plurality of variables, using the adjusted independence relationship as the second independence relationship.

7. The method of claim 6, wherein the adjusting the first independence relationship according to the first adjustment scheme, to obtain the second independence relationship, comprises:
in a case where the second test result is that the adjusted independence relationship is inconsistent with the actual independence of the plurality of variables, using the adjusted independence relationship as a new first independence relationship; and
adding one to the number of adjustments, and returning to the operation of determining the first adjustment scheme according to the plurality of variables and the first independence relationship.

8. The method of claim 7, further comprising:
after the number of adjustments reaches a set value, determining at least two variables that are not independent of each other in the variables; and
determining the second independence relationship according to the at least two variables that are not independent of each other.

9. The method of claim 1, wherein the obtaining the causal relationship information processing result according to the second independence relationship, comprises:
determining a causal relationship among the plurality of variables according to the second independence relationship.

10. An electronic device, comprising:
at least one processor; and
a memory communicatively connected with the at least one processor, wherein
the memory stores instructions executable by the at least one processor, and the instructions, when executed by the at least one processor, enable the at least one processor to perform operations of:
determining a first independence relationship according to a plurality of variables and values respectively corresponding to the plurality of variables, wherein the first independence relationship comprises: the plurality of variables being independent of each other;
determining a first adjustment scheme according to the plurality of variables and the first independence relationship;
adjusting the first independence relationship according to the first adjustment scheme, to obtain a second independence relationship; and
obtaining a causal relationship information processing result according to the second independence relationship,
wherein the determining the first adjustment scheme according to the plurality of variables and the first independence relationship, comprises:
performing a test on a consistency between the first independence relationship and actual independence of the plurality of variables, to obtain a first test result; and
determining the first adjustment scheme according to the first test result,
wherein at least two variables of the plurality of variables comprise a first variable and a second variable; and the plurality of variables being independent of each other comprises:
the first variable and the second variable being independent under a condition that there is a further variable; or
the first variable and the second variable being relatively independent,
wherein for the first independence relationship, two relatively independent variables constitute a variable pair, and the variable pair and a corresponding independent condition constitute an individual independent assumption; through individual independent assumptions of two different forms, the individual independent assumption or the first independence relationship is divided into an independence level and a separation set level, the independence level comprises that the first variable and the second variable are independent, and the separation set level comprises a condition that the first variable and the second variable are independent,
in a case where the first variable and the second variable are independent under the condition that there is the further variable, the first adjustment scheme comprises:
adjusting the further variable, by using at least one of schemes of:
testing all possible separation sets in sequence, and selecting a separation set with a highest corresponding score or correct ratio;
adjusting a V structure; or
adjusting a causal relationship that violates common sense knowledge,
wherein in a case that there are a plurality of schemes for adjusting a separation set, a scheme with a highest composite score is obtained by scoring each individual independent assumption.

11. The electronic device of claim 10, wherein the performing the test on the consistency between the first independence relationship and the actual independence of the plurality of variables, comprises:
determining nodes and edges based on the first independence relationship, wherein the nodes correspond to the variables, and each of the edges is used to indicate that two nodes connected by the edge are not independent of each other;

determining the V structure according to the first independence relationship, the nodes, and the edges, to obtain a preliminary directed acyclic graph about all of the variables, wherein the V structure comprises a top node and an end node on each of both sides of the top node, an edge exists between the end node and the top node and points to the top node, the end node is a cause, and the top node is a result;

performing a completion on a direction of an undirected edge in the preliminary directed acyclic graph according to a preset completion rule, to obtain a completion result; and performing the test on the consistency between the completion result and the actual independence of the plurality of variables.

12. The electronic device of claim 11, wherein the performing the completion on the direction of the undirected edge in the preliminary directed acyclic graph according to the preset completion rule, comprises:

for the undirected edge in the preliminary directed acyclic graph, in a case where performing the completion according to a first direction will cause a conflict with the preset completion rule, performing the completion on the edge in accordance with a second direction opposite to the first direction; and for the undirected edge in the preliminary directed acyclic graph, in a case where performing the completion according to the first direction will not cause a conflict with the preset completion rule, and performing the completion according to the second direction will cause a conflict with the preset completion rule, performing the completion on the edge in accordance with the first direction.

13. The electronic device of claim 11, wherein the performing the test on the consistency between the completion result and the actual independence of the plurality of variables, comprises:

performing the test on the consistency between the completion result and the actual independence of the plurality of variables according to a preset test rule.

14. A non-transitory computer-readable storage medium storing computer instructions, wherein the computer instructions, when executed by a computer, cause the computer to perform operations of:

determining a first independence relationship according to a plurality of variables and values respectively corresponding to the plurality of variables, wherein the first independence relationship comprises: the plurality of variables being independent of each other;

determining a first adjustment scheme according to the plurality of variables and the first independence relationship;

adjusting the first independence relationship according to the first adjustment scheme, to obtain a second independence relationship; and obtaining a causal relationship information processing result according to the second independence relationship, wherein the determining the first adjustment scheme according to the plurality of variables and the first independence relationship, comprises:

performing a test on a consistency between the first independence relationship and actual independence of the plurality of variables, to obtain a first test result; and determining the first adjustment scheme according to the first test result, wherein at least two variables of the plurality of variables comprise a first variable and a second variable; and the plurality of variables being independent of each other comprises:

the first variable and the second variable being independent under a condition that there is a further variable; or the first variable and the second variable being relatively independent, wherein for the first independence relationship, two relatively independent variables constitute a variable pair, and the variable pair and a corresponding independent condition constitute an individual independent assumption; through individual independent assumptions of two different forms, the individual independent assumption or the first independence relationship is divided into an independence level and a separation set level, the independence level comprises that the first variable and the second variable are independent, and the separation set level comprises a condition that the first variable and the second variable are independent, in a case where the first variable and the second variable are independent under the condition that there is the further variable, the first adjustment scheme comprises:

adjusting the further variable, by using at least one of schemes of:

testing all possible separation sets in sequence, and selecting a separation set with a highest corresponding score or correct ratio;

adjusting a V structure; or adjusting a causal relationship that violates common sense knowledge, wherein in a case that there are a plurality of schemes for adjusting a separation set, a scheme with a highest composite score is obtained by scoring each individual independent assumption.

* * * * *